March 22, 1955 J. MINKOFF Re. 23,967

BINDING FOR LOOSE LEAVES

Original Filed Feb. 14, 1951

INVENTOR
JOUVAL MINKOFF
BY Ridsdale Ellis
HIS ATTORNEY

United States Patent Office

Re. 23,967

Reissued Mar. 22, 1955

23,967

BINDING FOR LOOSE LEAVES

Jouval Minkoff, Geneve, Switzerland, assignor, by mesne assignments, to Plastic Loose Leaf, Inc., Chicago, Ill., a corporation of Illinois Original No. 2,648,338, dated August 11, 1953, Serial No. 210,811, February 14, 1951. Application for reissue December 2, 1953, Serial No. 395,858

6 Claims. (Cl. 129—24)

Matter enclosed in heavy brackets [ ] appears in the original patent but forms no part of this reissue specification; matter printed in italics indicates the additions made by reissue.

The invention relates to binders for loose leaves, of which there are many types. While this sort of binder is much appreciated by users, its cost is still relatively high because it requires a comparatively long time to assemble the component parts. Most of the existing binders include a device comprising two opposing sets of claws forming rings to receive the loose leaves, as well as mechanism for actuating at least one of the said sets of claws in order to bring their ends together or separate them as required. Heretofore these claws and the operating mechanism therefor have been mounted on a metallic support, which was riveted or fixed by other means to the inside face of a cover comprising two side covers fastened together by a back portion.

One of the objects of the present invention is to provide a binder of the aforesaid type which avoids the necessity for mounting the claws and their operating mechanism inside the back which connects the two side covers. For this purpose the binder consists of two side covers connected together by a back composed of a claw support and actuating mechanism for the claws.

The attached schematic drawings show, by way of example, one embodiment of a binder constructed in accordance with the present invention. In the drawings.

Figure 1:
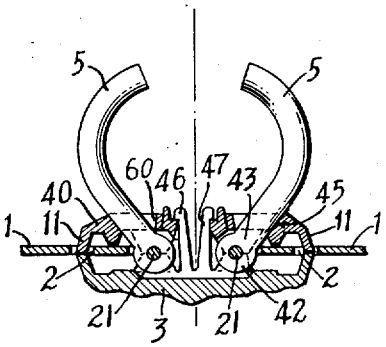
Fig. 1 is a transverse cross-sectional view of the binder, taken along the line 1—1 of Fig. 3, the claws and side covers being in open position.

According to the embodiment of the invention illustrated in the drawings, the binder comprises two side covers 1 hingedly connected to a back portion comprising a support or strip 3 and a cover or strip 40. This cover 40 is provided with beaks 11 passing through the perforations 2 of the side covers 1.

This cover has openings 41 through which the claws 5 extend. The latter are mounted on two parallel axles 21 and revolve freely thereon. Half-bearings 42 and 43, of which some are fastened to the support 3 while the others are fastened to the cover 40, keep the axles 21 in position. The cover and the support each have an end wall 44, of which only one is shown in the drawings. The axial movement of each axle 21 is limited longitudinally by stops (not shown).

Each opening 41 comprises a wall 45 inclined in relation to the axles 21 acting as a cam for operating the claws 5. Finally, as shown, the back of the binder comprises devices for locking the cover on its support. These devices at the same time act as guiding means for the cover.

These guiding devices each consist of two locks fastened to the support 3 and symmetrically arranged in relation to the middle plane of the back of the binder. Each lock comprises a beak 46 carried by a resilient foot 47 and cooperating with a flat-topped shoulder 48 whose width is limited by the surfaces 49 and 50 parallel with the axes 21. These two surfaces 49 and 50 cooperating with the edge 51 of the beak 46, on the one hand, and the inside face 52 of its foot, on the other hand, constitute guides permitting relative displacement of the cover and of its support in a longitudinal direction only.

Figure 3:
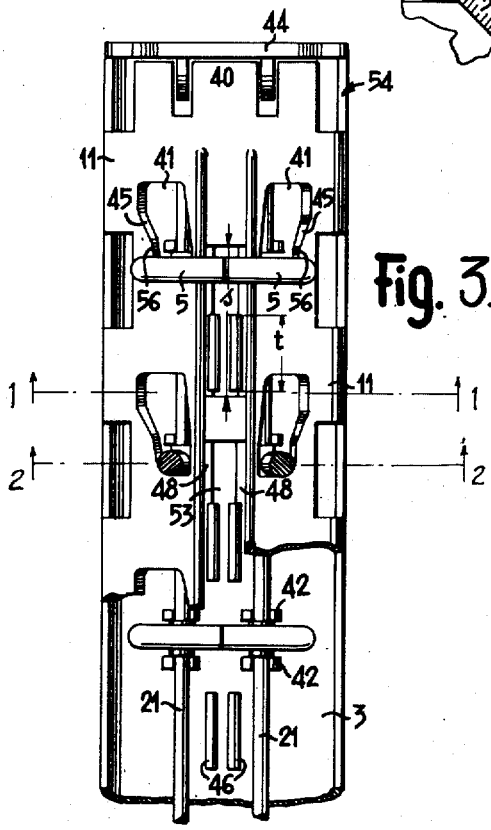
Fig. 3 is a top view of the support carrying the claws and their operating mechanism, without the side covers.

The top surfaces of the shoulder 48 have a length s greater than the length t of the beaks *46* (Fig. 3), in order to permit the longitudinal displacement of the cover in relation to the support. Between these surfaces 48 is provided an opening 53 intended for the passage of a pair of beaks *46*.

Figure 4:
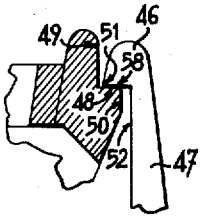
Fig. 4 is a detail view on a larger scale of part of the mechanism shown in Figs. 1 and 2.

The assembling of the binder shown is performed as follows: In the first place, the side covers 1 are brought into engagement with the beaks 11 of the cover 40. Then the claws 5 which have previously been mounted on the axles 21 are passed through the openings 41. These axles are allowed to rest on the half-bearings 43. Then, it is sufficient, for completing the assembling of the back portion of the binder, to place the support 3 on top of the cover 40 and push the two together. This causes the beaks 46 to slide along the walls 50, against the resilient spring pressure of the feet 47 and thus bring the beaks into locking engagement with the shoulders 48 (position shown in Figs. 1, 2 and 4). The plane of the top of said shoulders is so situated in relation to the hooking surfaces 58 of the beaks and to the axles 21 and their supporting bearings 42 and 43 that, when the parts in the position shown in Figs. 1 and 2, these half-bearings keep the axles 21 parallel one with another and also parallel with the central plane. Finally, in the assembled position shown in Figs. 1 and 2, the ends of the beaks 11 cooperate with the upper faces 54 of the wings of the U formed by the support 3 in order to retain the side covers in place.

Figure 2:
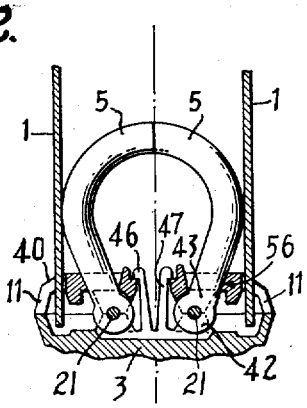
Fig. 2 is a similar section to Fig. 1, taken along the line 2—2 of Fig. 3, the claws and side covers being in closed position.

The opening and the closing of the rings of the binder back are controlled by the relative longitudinal displacement of the cover 40 and of the support 3, the extent of these displacements being limited by engagement of the ends of the cover 40 with the end walls 44 of the support 3. Each pair of claws forming a ring is kept in closed position (Figs. 2 and 3) by a wall 56 of the opening 41. However, if the cover is displaced downwards from the position shown in Fig. 3, the claws liberated from the inclined surfaces 45 are turned on their axles 21 by the cam portion 60 and open as shown in Fig. 1. Then, the user can introduce loose leaves into the binder or remove leaves therefrom. After having completed this operation, the user slides the cover 40 upwardly (Fig. 3) to close the rings.

The support and the claws may be formed of plastic material. It will be understood that there are many other possible embodiments of the invention in addition to the one illustrated and described.

I claim:

1. A loose-leaf binder comprising a back formed of inner and outer strips connected for slidable movement relatively to each other, the outer strip having straight unindented longitudinal edges, the inner strip having its longitudinal edges comprising a series of projecting beaks turned toward and contacting the said longitudinal edges of the outer strip, side covers each having a series of holes along one margin for the passage of said beaks which thereby hingedly connect the back to the side covers, opposing pairs of claws carried by said back, said inner strip having openings through which said claws extend, said openings being inclined with respect to the center line of said strip whereby longitudinal movement of said inner strip relatively to said outer strip causes *the claws of* each pair of claws to move toward and away from [each other] *the opposite claws* to permit insertion or withdrawal of loose leaves.

2. A loose-leaf binder as in claim 1, in which both the inner and outer strips forming the back are U-shaped in cross-section and arranged so that each strip has its longitudinal edges turned toward the longitudinal edges of the other, and the intervening parts of such strips are separated from each other to provide a space within which the bases of the claws are located.

3. A loose-leaf binder comprising a back formed of inner and outer strips slidable longitudinally relatively to each other, the inner strip only having its longitudinal edges comprising a series of projecting beaks turned toward and contacting the longitudinal edges of the outer strip, side covers each having a series of holes along one margin for the passage of said beaks which thereby hingedly connect the back to the side covers, opposing pairs of claws carried by said back and projecting through openings in the inner strip of said back, means operable by sliding one of said strips relatively to the other for moving each pair of claws toward each other to form closed leaf-retaining rings, and means operable by sliding one of said strips relatively to the other in the opposite direction for moving *the claws of* each pair of claws away from [each other] *the opposite claws* to permit insertion or withdrawal of loose leaves.

4. A loose leaf binder as in claim 3 which includes means secured to the outer portion of the back extending through and bearing on the inner side of the inner strip whereby said inner and outer strips are free to slide relatively to each other while contact between said beaks on said inner strip and the edges of said outer strip is maintained.

5. A loose-leaf binder as in claim 3 which includes members secured to the outer strip of the back extending through a series of longitudinal slots along the center line of the inner strip of the back, such members having shoulders to engage the margins of said slots to slidably hold the inner and outer strips of the back together.

*6. In a loose-leaf binder, a back comprising inner and outer strips slidable longitudinally relative to each other,*

*each of said strips being U-shaped in cross section, one of said strips having its longitudinal edges comprising a series of projecting beaks turned towards and slidably contacting the longitudinal edges of the other strip, side covers each having a series of holes along one margin for the passage of said beaks which thereby hingedly connect the back to the side covers, opposing pairs of claws carried by said strips and projecting through openings in the inner strip of said back, means operable by sliding one of said strips longitudinally relative to the other for moving the claws of each pair of claws toward each other to form closed leaf-retaining rings, and means operable by sliding one of said strips longitudinally relative to the other in the opposite direction for moving the claws of each pair of claws away from each other to permit insertion or withdrawal of loose leaves.*

References Cited in the file of this patent or the original patent

UNITED STATES PATENTS

| | | |
|---|---|---|
| 651,254 | Krah | June 5, 1900 |
| 763,176 | Gresham et al. | June 21, 1904 |
| 798,301 | Schade | Aug. 29, 1905 |
| 801,208 | Boden | Oct. 10, 1905 |
| 1,550,050 | Schade | Aug. 18, 1925 |
| 2,005,968 | Brown | June 25, 1935 |
| 2,533,590 | Kutik | Dec. 12, 1950 |